Aug. 29, 1933.  L. EDELMANN  1,924,917

GLASS BARREL FOR HYDROMETERS

Filed March 10, 1930

INVENTOR.
Leo Edelmann
BY
Lloyd W. Patek
ATTORNEY.

Patented Aug. 29, 1933

1,924,917

UNITED STATES PATENT OFFICE 1,924,917

GLASS BARREL FOR HYDROMETERS

Leo Edelmann, Chicago, Ill., assignor to E. Edelmann & Co., Chicago, Ill., a corporation of Illinois Application March 10, 1930. Serial No. 434,731

2 Claims. (Cl. 265—45)

My invention relates to glass barrels for hydrometers, and particularly to such barrels intended and adapted for use with hydrometers of the syringe type such as are used in testing battery liquid, anti-freeze solutions, and the like.

An object of my invention is to provide a glass barrel for hydrometers and the like which is of such form and construction that it can be made to possess greater weight and strength than the usual glass barrels now in use, which are blown or otherwise formed from tubing.

Another object is to provide a barrel of such form and construction that the stem of the float therein cannot touch the side of the jar to adhere thereto and thus interfere with proper floating and an accurate reading.

With the above and other objects in view which will be apparent to those skilled in the art, my invention includes certain novel features of construction and combinations of parts which will be hereinafter set forth in connection with the drawing and then pointed out in the claims.

Figure 1:
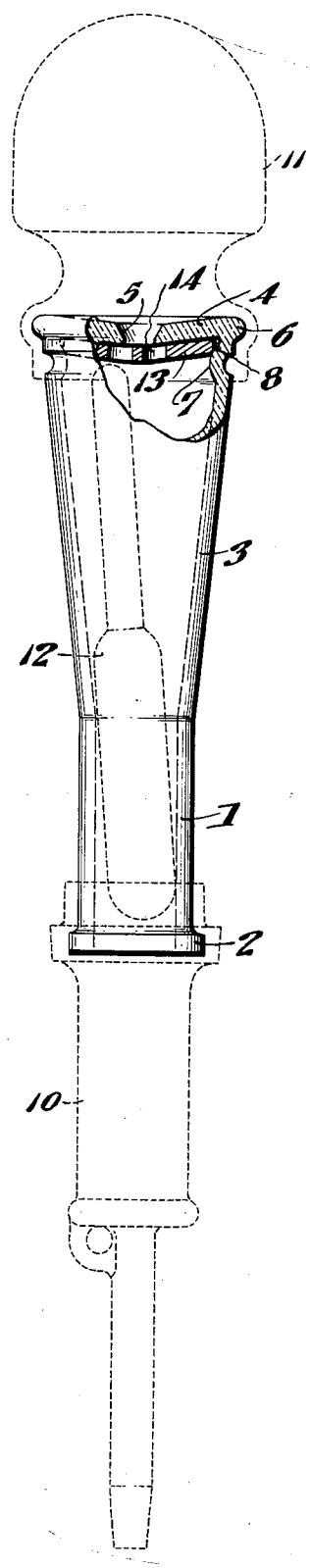
Fig. 1 is a view in side elevation, with a fragmentary portion in section, of a glass barrel made in accordance with my invention and showing other portions of a syringe hydrometer dotted in position.
Figure 2:
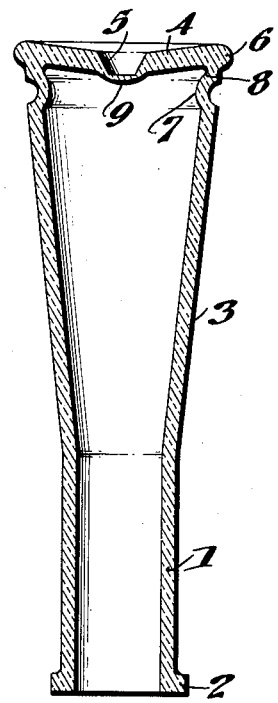
Fig. 2 is a vertical sectional view through a glass barrel as it would appear when taken from the machine.
Figure 3:
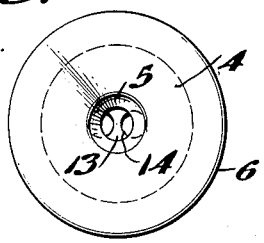
Fig. 3 is a view in upper end elevation of the barrel as shown in Fig. 1.

In the manufacture of glass barrels such as used in syringe hydrometers and the like, it has been customary heretofore to use glass tubing which is severed into pieces of the proper length and is shaped by blowing, by turning out beaded rims, or by other manual operations, and with such glass barrels it has been necessary to select tubing of uniform diameter and thickness as the stock, and then when the barrel is flared out or otherwise shaped, this material will be reduced in strength in portions of the barrel. Such glass barrels are expensive to manufacture and the finished product is very fragile as portions of the glass are too often blown out to be quite thin and it is not practicable to anneal or otherwise temper the finished barrels.

With the above in mind it is a purpose of my invention to provide a glass barrel which can be manufactured upon a bottle machine or with the use of other automatic machinery, and which is of such character that the sizes will be easily held within the desired limits of variation and the finished product will be a more uniform and stronger glass barrel than is produced by manual operation.

The finished glass barrel consists of a neck portion 1 which has a head flange 2 around its upper end, the barrel being flared or tapered to increased size, as at 3, at the remaining end of the neck. A head portion 4 is provided at the end of the flared portion 3, and this head has an opening 5 therethrough. A bead 6 is provided externally around the head end 4, and the mold or other shaping structure is constructed to form an internal bead 7 around the wall of the tapered portion 3 adjacent to and slightly spaced from the head end 4.

In constructing a glass jar in accordance with my improved method any adaptable type of bottle or other automatic glass machinery can be used, and the outer form of the barrel will be readily attained by the use of a mold or other mechanism. The inner cylindrical opening of the neck 1 will be held in proper size by the use of a plunger, and the quantity of glass can be regulated to make the top or head 4 of the desired thickness, so that an annular recess will be left at 8 inside the bead 7 and adjacent the head 4. In forming the glass body, it may be found necessary to leave the recess forming opening 5 closed by a thin film of glass as indicated at 9, and when the glass barrel has been formed and has cooled, this thin film at 9 can be readily broken out to leave the opening 5. It will be understood that the glass barrels can be annealed, tempered, or treated in any other desired manner, by commercial methods, to increase the strength and durability of the glass, and as it is not necessary to heat the glass barrels or otherwise work the same as in the case of glass tubing now ordinarily used, the entire glass structure will be uniformly tempered to thus have greater strength in use and resistance against temperature changes.

With this improved glass barrel a hydrometer tip or nozzle 10 will be fitted at the open end of the neck 1 and a bulb 11 will be fitted at the head end. The float 12 will be placed within the glass barrel and as the internal diameter of the neck 1 is held to certain definite limits, the float cannot twist laterally within the barrel to cause the stem thereof to come in contact with the side wall of the barrel. The head 4 would ordinarily serve to limit upward movement of the float within the barrel so that the float would not go into the bulb 11, but I find it desirable to place a cushion washer 13 within the barrel against the lower side of the top 4 to prevent sharp contact of the float with the head which might cause breakage of the float. This cushion washer 13 has openings 14 therethrough and the bulb 11 can thus be used to draw in and eject the liquid to be tested.

With this form of cast glass barrel it will be possible to apply the name of the manufacturer or a trade-mark, to place instructions thereon, or to cast in wording or symbols which may be necessary or desirable, and it will be possible to readily form the beads 2 and 6 and the other portions of the glass barrel to any desired shape to suit the particular requirements of use.

While I have herein shown and described only certain specific embodiments of my invention and have suggested only certain possible modifications, it will be appreciated that changes and variations can be resorted to in the form and construction, without departing from the spirit and scope of my invention.

I claim:

1. A glass barrel for hydrometers and the like comprising a neck having its diameter fixed within certain limits and provided with a bead at one end, said barrel having a portion thereof flared from the remaining end of the neck portion to a large diameter with the flared end provided with a top having an opening therethrough, said flared portion having an inwardly disposed bead adjacent to and spaced from the top and an outwardly extending bead at its end around the top.

2. A glass barrel for hydrometers and the like comprising a neck having its diameter fixed within certain limits and provided with a bead at one end, said barrel having a portion thereof flared from the remaining end of the neck portion to a large diameter with the flared end provided with a top having an opening therethrough, said flared portion having an inwardly disposed bead adjacent to and spaced from the top and an outwardly extending bead at its end around the top, and a cushion washer within said barrel and held in place against the top by the inwardly extending bead and having an opening registering with the opening of the top.

LEO EDELMANN.